United States Patent [19]

Iizuka

[11] Patent Number: 5,382,201
[45] Date of Patent: Jan. 17, 1995

[54] CONTROL SYSTEM FOR AUTOMOTIVE AUTOMATIC TRANSMISSION

[75] Inventor: Naonori Iizuka, Fuji, Japan

[73] Assignee: JATCO Corporation, Fuji, Japan

[21] Appl. No.: 74,339

[22] Filed: Jun. 10, 1993

[30] Foreign Application Priority Data

Aug. 24, 1992 [JP] Japan .................................. 4-247327

[51] Int. Cl.6 ............................................ F16H 61/06
[52] U.S. Cl. .................................... 475/123; 477/155
[58] Field of Search ................. 475/123, 127; 477/155

[56] References Cited

U.S. PATENT DOCUMENTS

| | | | |
|---|---|---|---|
| 4,949,595 | 8/1990 | Shimanaka | 74/866 |
| 4,953,090 | 8/1990 | Narita | 364/424.1 |
| 5,046,383 | 9/1991 | Butts et al. | 74/862 |
| 5,163,342 | 11/1992 | Pollack et al. | 74/866 |
| 5,188,005 | 2/1993 | Sankpal et al. | 74/866 |
| 5,191,815 | 3/1993 | Kouta | 74/866 |
| 5,203,235 | 4/1993 | Iizuka | 74/866 |
| 5,233,889 | 8/1993 | Iizuka | 74/866 |
| 5,249,483 | 10/1993 | Iizuka | 74/866 |
| 5,305,665 | 4/1994 | Sano et al. | 74/869 |

FOREIGN PATENT DOCUMENTS 2-21059  1/1990  Japan .

*Primary Examiner*—Dirk Wright
*Attorney, Agent, or Firm*—Foley & Lardner

[57] ABSTRACT

In a control system for an automotive automatic transmission having a friction element powered by a line pressure, a gear ratio provided by the transmission is measured. An inertial phase keeping time is measured, which is the time for which the transmission assumes an inertial phase. A line pressure adjuster is employed to adjust the line pressure in a manner to harmonize the inertial phase keeping time with a predetermined time. An inertial phase starting time is measured, which is the time elapsed until the inertial phase of the transmission starts. A line pressure increasing device is employed for increasing the line pressure irrespective of condition of the line pressure adjuster when the inertial phase starting time exceeds a first given time. An inhibitor is employed to suppress the operation of the line pressure increasing device in case wherein even when the inertial phase starting time exceeds a second given time longer than the first predetermined time, the change of the gear ratio does not occur.

3 Claims, 9 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ○ | | | | ○ | ○ | $\dfrac{1+\alpha_2}{\alpha_2}$ | 3.027 |
| | 2ND. SPEED | | | ○ | | ○ | | ○ | | $\dfrac{\alpha_1+\alpha_2+\alpha_1\alpha_2}{\alpha_2(1+\alpha_1)}$ | 1.619 |
| | 3RD. SPEED | | ○ | ○ | | | | ○ | | 1 | 1.000 |
| | 4TH. SPEED | | ○ | | | ○ | | | | $\dfrac{1}{1+\alpha_1}$ | 0.694 |
| ENGINE BRAKE RUNNING STATE | 1ST. SPEED | | | (○) | ○ | | | (○) | (○) | | |
| | 2ND. SPEED | | | (○) | ○ | ○ | | (○) | | | |
| | 3RD. SPEED | | ○ | (○) | ○ | | | (○) | | | |
| | 4TH. SPEED | | ○ | (○) | | ○ | | | | | |
| REVERSE | | ○ | | | | | ○ | | | $-\dfrac{1}{\alpha_1}$ | -2.272 |

CONTROL SYSTEM FOR AUTOMOTIVE AUTOMATIC TRANSMISSION

BACKGROUND OF THE INVENTION

This application has relation with U.S. patent applications Ser. Nos. 07/795,989 (filed Nov. 22, 1991) now U.S. Pat. No. 5,191,815, 07/850,283 (filed Mar. 12, 1992) now U.S. Pat. No. 5,203,235, 07/878,469 (filed May 5, 1992) now U.S. Pat. No. 5,233,889, 07/939,600 (filed Sep. 2, 1992) now U.S. Pat. No. 5,305,665 and 07/969,072 (filed Oct. 30, 1992) now U.S. Pat. No. 5,249,483.

1. Field of the Invention

The present invention relates in general to automotive automatic transmissions, and more particularly to a control system for the automotive automatic transmissions.

2. Description of the Prior art

In automotive automatic transmissions, there has been proposed a control system, in which a so-called "inertial phase keeping time" for which the transmission gear ratio is being varied is measured, and the line pressure applied to a friction element, such as clutch or the like, is controlled to a lower level during the gear change operation so that the inertial phase keeping time can take a desired value. However, in case wherein the line pressure is quite low, the gear change can not be completed within the time for which the line pressure is controlled low. When, under this condition, the line pressure is raised thereafter, the friction element is engaged suddenly, which causes a marked shift shock.

In order to solve such drawback, a measure has been proposed, which is shown in Japanese Patent First Provisional Publication 2-21059. That is, in the measure, a so-called "inertial phase starting time" elapsed from issuance of a gear change instruction to the time when the inertial phase actually starts is measured, and when the measured time exceeds a predetermined time (that is, when, due to lowering in the line pressure, the starting of the inertial phase is delayed), the line pressure is raised irrespective of the inertial phase keeping time.

When, for example, a select position switch is out of order, and thus when, irrespective of D-range signal being fed to a control unit, the transmission is kept in N-range, operation of a shift solenoid effected by the gear change instruction does not induce the change of the gear ratio.

However, due to its inherent construction, the above-mentioned measure has the following drawback.

That is, even under the above-mentioned condition, the line pressure is raised by judging that the inertial phase starting time is too long. Accordingly, when thereafter the gear change operation actually starts, the gear change is carried out with the higher line pressure, which causes a marked shift shock.

SUMMARY OF THE INVENTION

It is therefore an object of the present invention to provide a control system for an automotive automatic transmission, which is free of the above-mentioned drawback.

According to the present invention, there is provided a control system which controls an automotive automatic transmission having a friction element powered by a line pressure. The control system comprises first means for detecting a gear ratio provided by the transmission; second means for measuring an inertial phase keeping time elapsed from the time when a change of the gear ratio starts to the time when the change ends; third means for adjusting the line pressure in a manner to harmonize the inertial phase keeping time with a first predetermined time; fourth means for measuring an inertial phase starting time elapsed from issuance of a gear change instruction to the time when the change of the gear ratio starts; fifth means for increasing the line pressure irrespective of condition of the third means when the inertial phase starting time exceeds a second predetermined time; and sixth means for suppressing the operation of the fifth means in case wherein even when the inertial phase starting time exceeds a third predetermined time longer than the second predetermined time, the change of the gear ratio fails to occur.

BRIEF DESCRIPTION OF THE DRAWINGS

Other objects and advantages of the present invention will become apparent from the following description when taken in conjunction with the accompanying drawings, in which:

FIG. 2 is a TABLE showing ON/OFF (viz., engaged/disengaged) conditions of various friction elements of the automatic transmission with respect to various gear positions selected by the transmission;

DETAILED DESCRIPTION OF INVENTION

In the following, the present invention will be described in detail with reference to the accompanying drawings.

Figure 1:
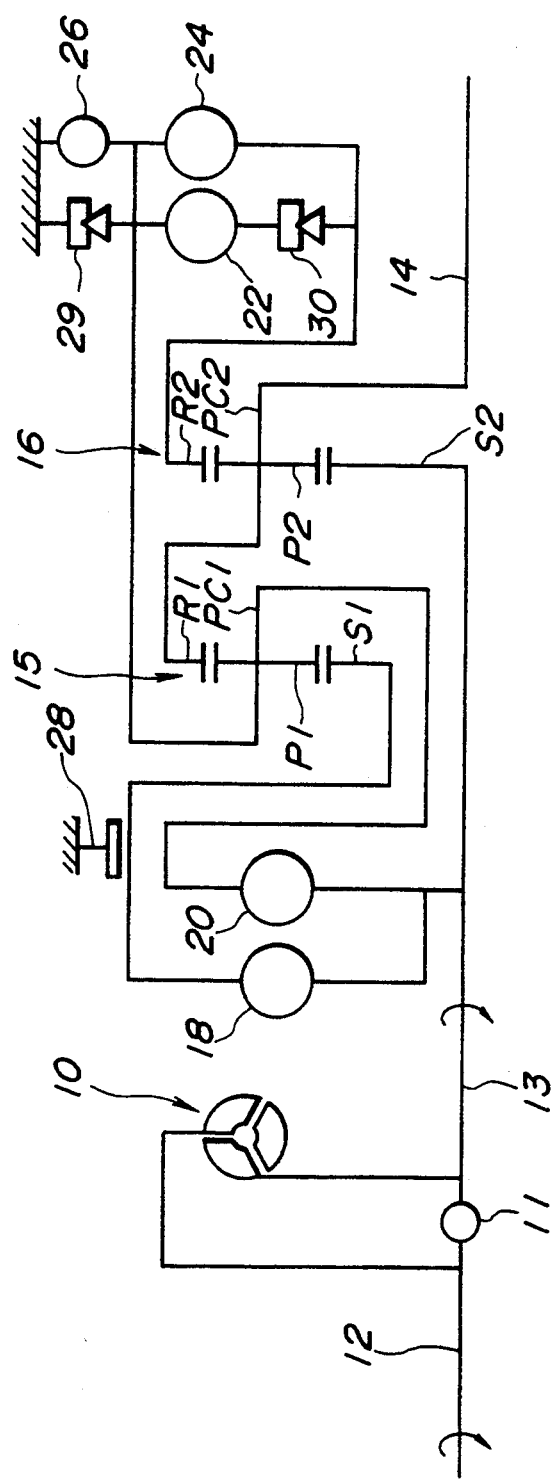
FIG. 1 is a schematic illustration of an automotive automatic transmission to which a control system of the present invention is applied.

In FIG. 1, there is schematically shown an automotive automatic transmission of a type which has four forward speeds (one being overdrive) and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown).

Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-oneway clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear R2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 2 is a table showing the various gear positions (viz., first, second, third and fourth forward speeds and a reverse) which are given by the ON/OFF (viz., engaged/disengaged) conditions of the clutches 18, 20, 22, 24, 29 and 30 and the brakes 26 and 28.

In the table, the mark "0" means "ON" or engaged condition of the associated clutch or brake and "blank" means "OFF" or disengaged condition of the same. The mark "(0)" means that the engaged condition does not participate in power transmission in the established gear speed. It is to be noted "α1" or "α2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 3:
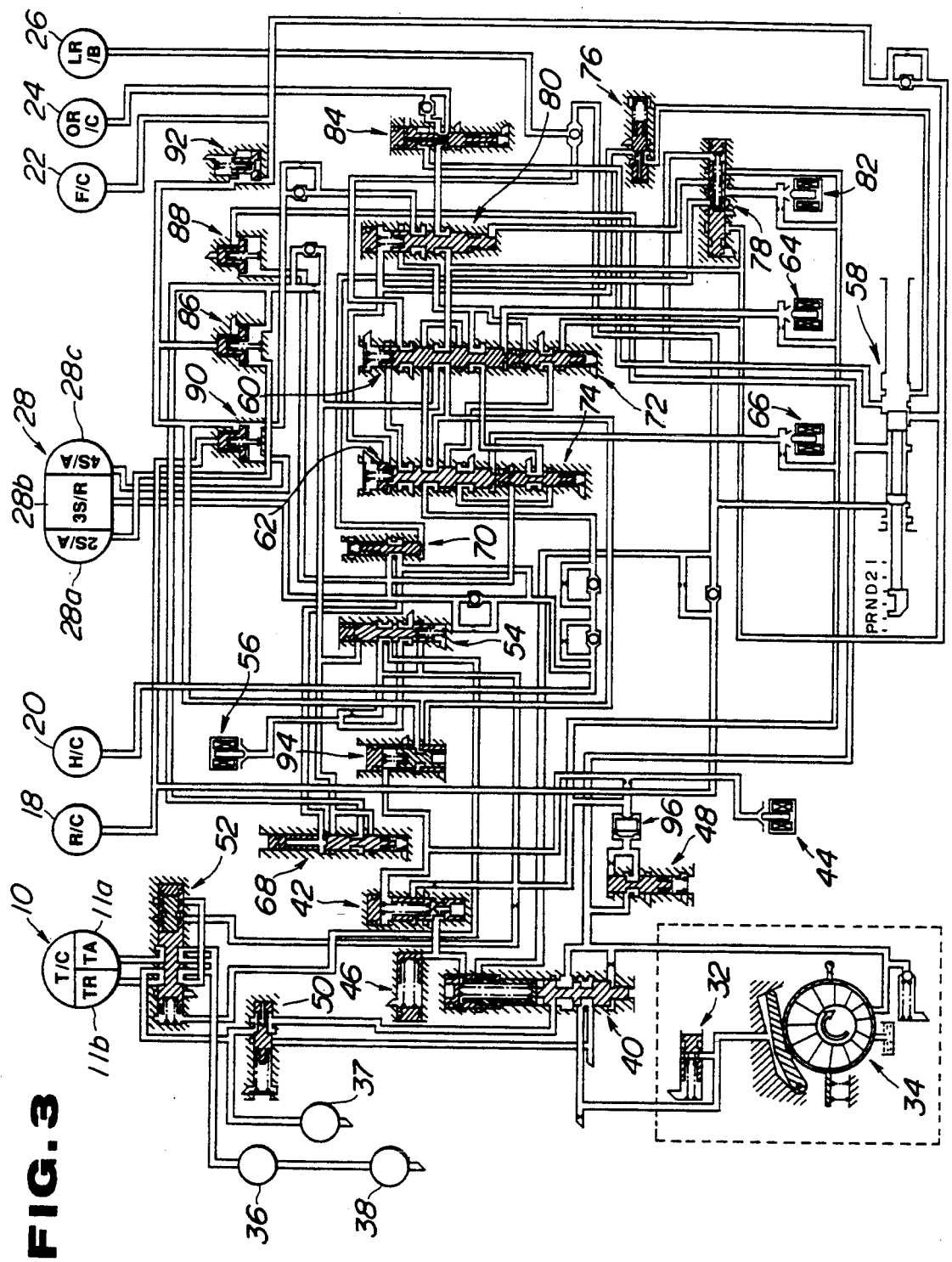
FIG. 3 is a schematic illustration of a hydraulic circuit of the automatic transmission.

FIG. 3 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 4:
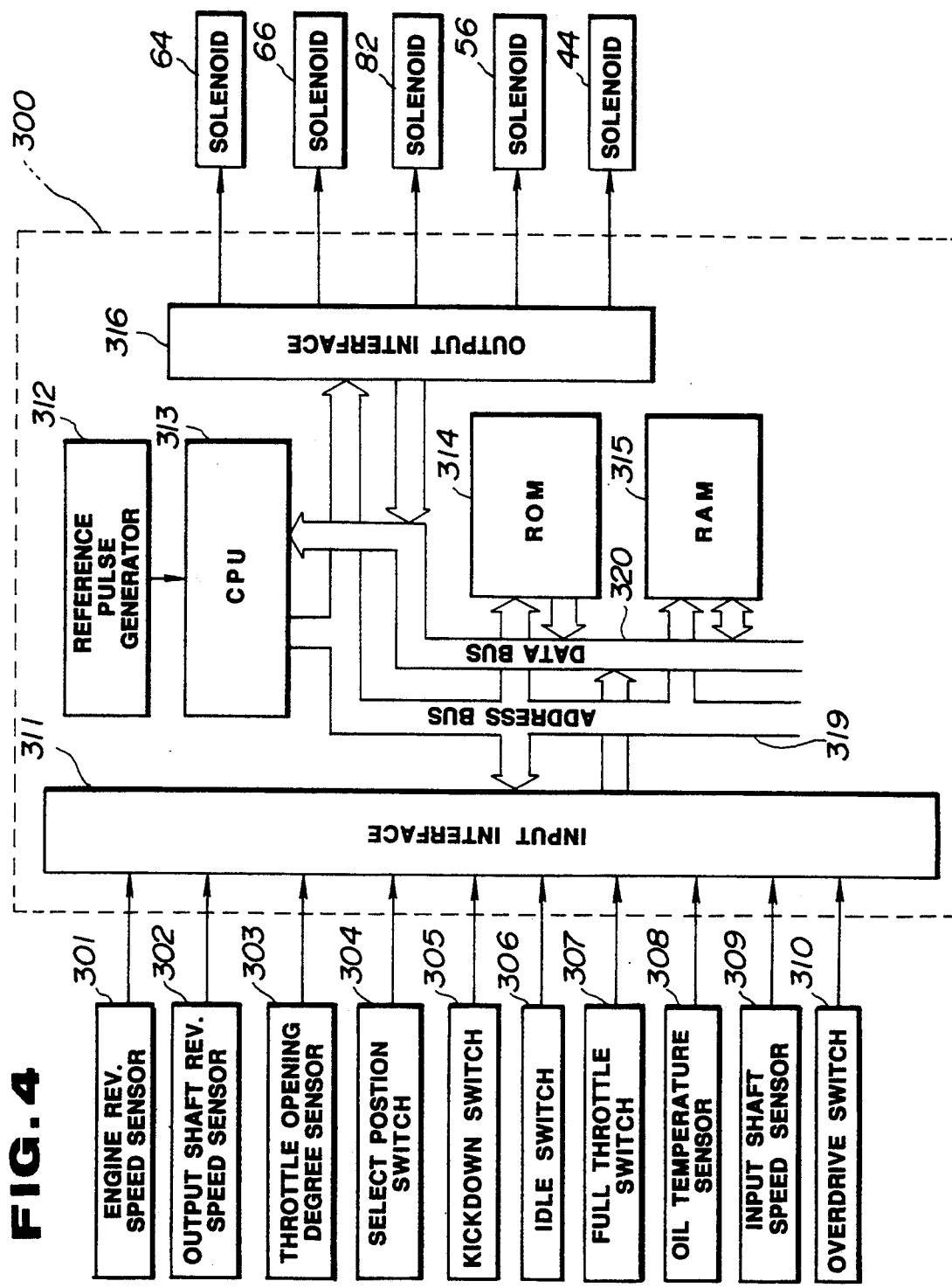
FIG. 4 is a schematic illustration of a control unit which constitutes an essential part of the control system of the present invention.

FIG. 4 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302 (output shaft revolution speed sensor), a throttle valve opening degree sensor 303, a select position switch 304, a kick down switch 305, an idle switch 306, a full throttle switch 307, an oil temperature switch 308, an input shaft speed sensor 309 and an over-drive switch 310 are fed to the control unit 300 through the input interface 311. Instruction signals from the control unit 300 are fed through the output interface 316 to the shift solenoids 64 and 66, the overrunning clutch solenoid 82, the lock-up control solenoid 56 and the line pressure control solenoid 44.

Figure 5:
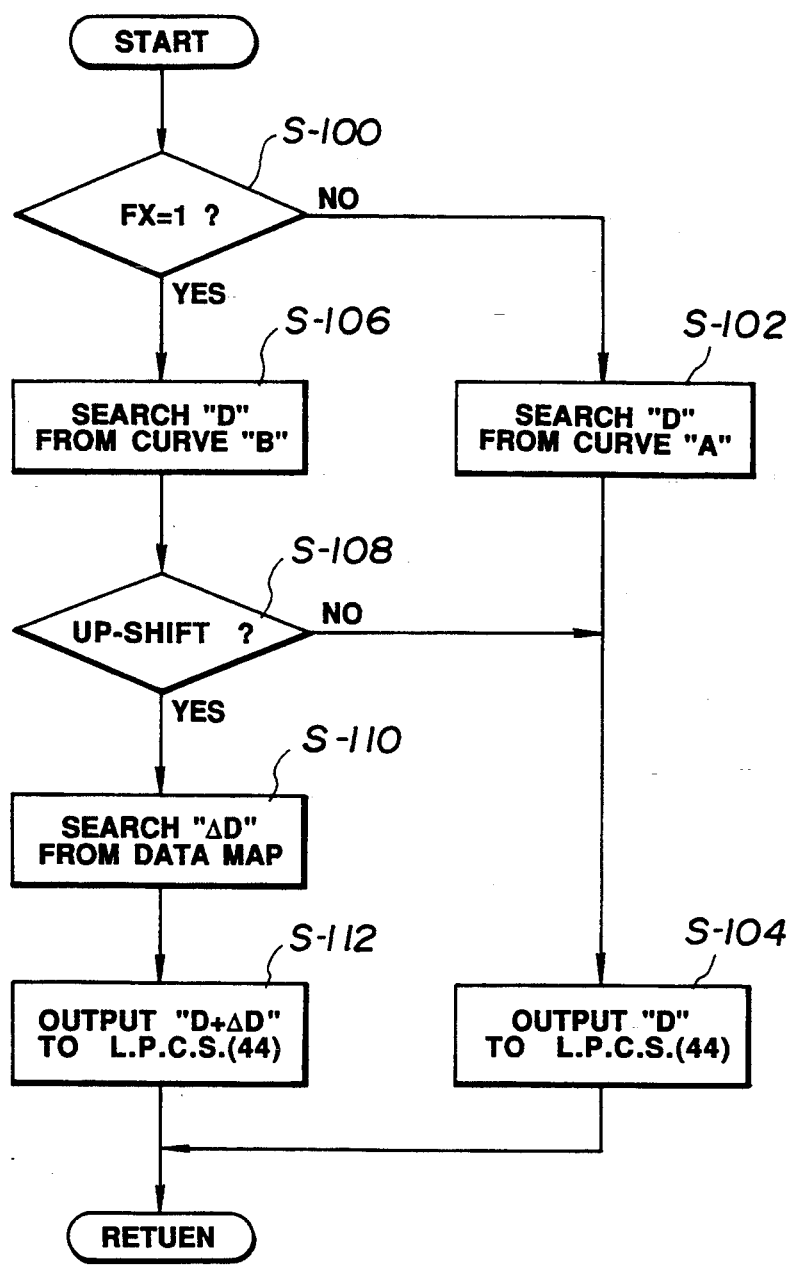
FIG. 5 is a flowchart showing programmed operation steps which are carried out periodically in an interruption subroutine for controlling the line pressure.
Figure 6:
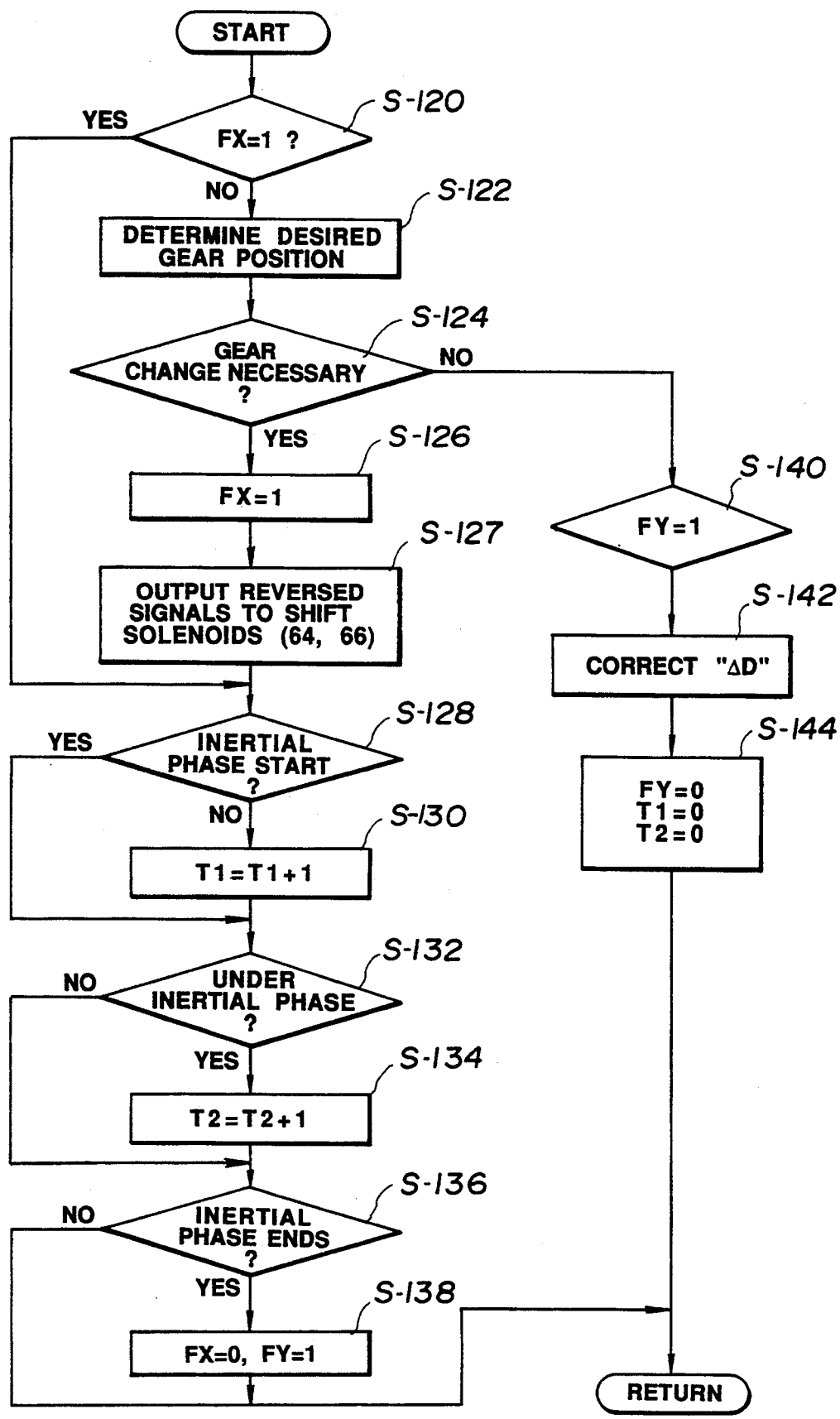
FIG. 6 is a flowchart showing programmed operation steps which are carried out periodically in another interruption subroutine for controlling the gear change.
Figure 7:
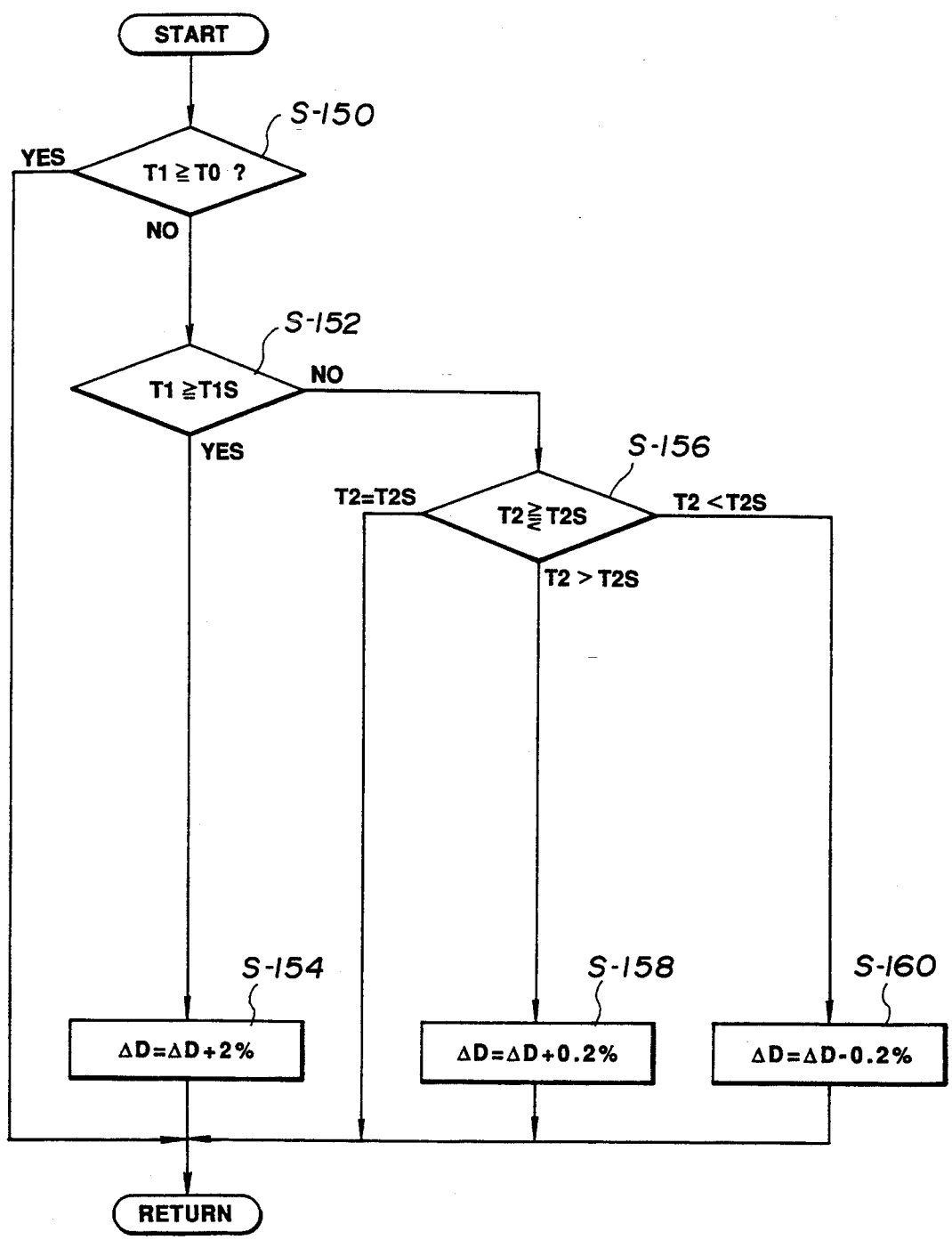
FIG. 7 is a flowchart showing programmed operation steps which are carried out for correcting and renewing a correction value.

The control unit 300 controls the automatic transmission in such a manner as is depicted in the flowcharts of FIG. 5, 6 and 7. The control is applied to a transmission gear change, for example to 1-2 gear change and the like, controlling the line pressure and the gear change.

FIG. 5 shows a flowchart of programmed operation steps which are carried out periodically in an interruption subroutine for controlling the line pressure.

Figure 8:
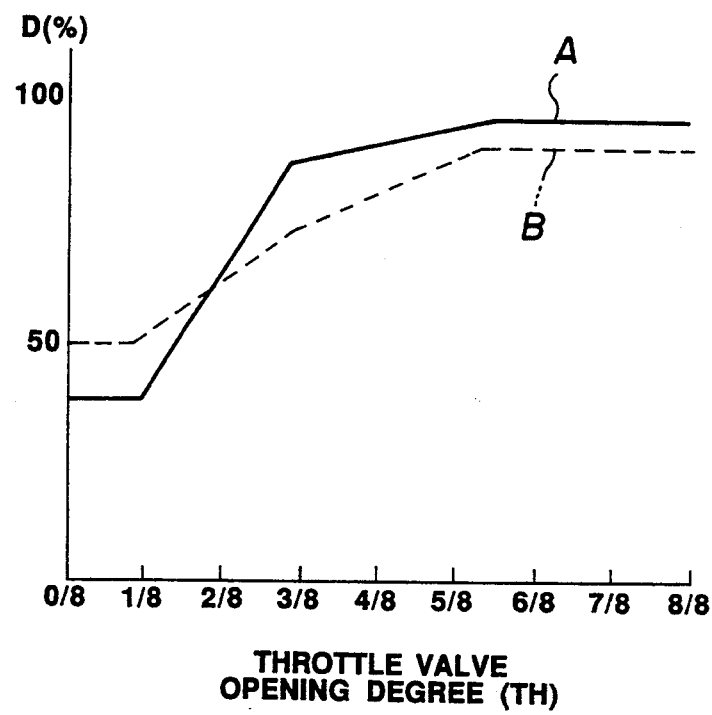
FIG. 8 is a graph showing a data map of line pressure used in a condition wherein the transmission is not under gear changing.

At step 100, a judgment is carried out as to whether a flag "FX" is 1 or not, that is, whether the transmission is under gear changing or not. If NO, that is, when the transmission is not under gear changing, the operation flow goes to step 102. At this step, as is shown in the graph of FIG. 8, from a data map of line pressure for the "not under gear changing B0 condition", which is indicated by the solid line of FIG. 8, a duty ratio "D" corresponding to the current throttle valve opening degree "TH" is searched, and at step 104, the duty ratio thus searched is outputted to the line pressure control solenoid 44.

Figure 9:
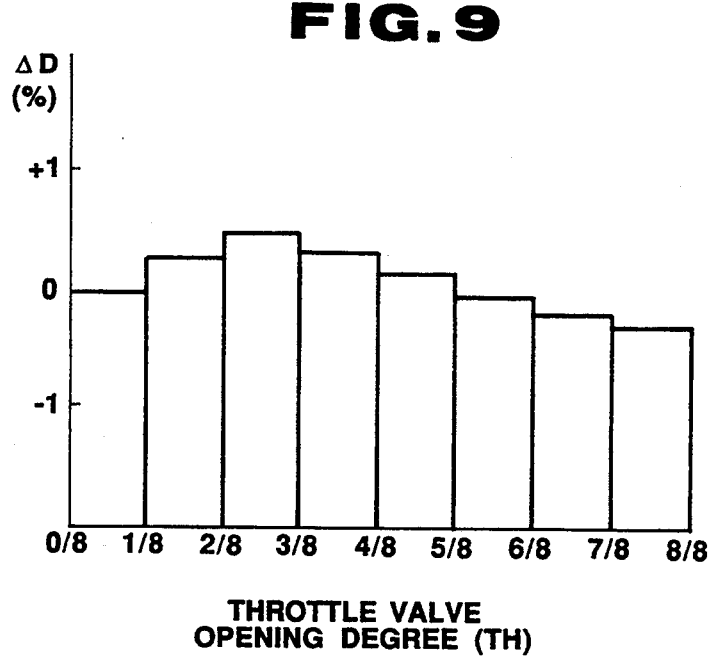
FIG. 9 is a graph showing a correction data map of line pressure used in a condition wherein the transmission is under upshifting.

While, if YES at step 100, that is, when the transmission is under gear changing, the operation flow goes to step 106. At this step, from a data map of line pressure for the "under gear change condition", which is indicated by the broken line of FIG. 8, a duty ratio "D" corresponding to the current valve opening degree "TH" is searched. The data map varies in accordance with the gear position selected and the mode of gear shifting (viz., upshift or downshift). At step 108, a judgement is carried out as to whether the gear change is an upshift or not. If NO, that is, when the gear change is a downshift, the operation flow goes to step 104 wherein the duty ratio "D" thus searched is outputted to the line pressure control solenoid 44. While, if YES at step 108, that is, when the gear changing is an upshift, the operation flow goes to step 110 wherein from a correction data map (as shown in FIG. 9) prepared by an after-described learning control, a correction value "ΔD" corresponding to the current throttle valve opening degree "TH" is searched, and at step 112, the sum of the duty ratio "D" and the correction value "ΔD" is outputted to the line pressure control solenoid 44.

FIG. 6 shows a flowchart of programmed operation steps which are also carried out periodically in another interruption subroutine for controlling the gear change.

At step 120, a judgement is carried out as to whether the flag "FX" is 1 or not, that is, whether the transmission is under gear changing or not. If NO, that is, when the transmission is not under gear changing, the operation flow goes to step 122. At this step, a desired gear position corresponding to both the current vehicle speed "V" and the current throttle valve opening degree "TH" is determined based on a predetermined normal gear selection pattern. Then, at step 124, a judgement is carried out as to whether a gear change is necessary or not, that is, whether or not the desired gear position thus determined is coincident with the current gear position. If YES, that is, when the desired gear position does not agree with the current gear position, the operation flow goes to step 126 wherein the flag "FX" is set to "1" which indicates the "gear changing condition", and at step 127, instruction signals are fed to the first and second shift solenoids 64 and 66 to change their conditions for the purpose of achieving the desired gear position in the transmission. Then, at step 128, a judgement is carried out as to whether the inertial phase of the transmission has started or not.

It is to be noted that when the gear ratio of the transmission has started to change from a given gear ratio at a previous gear position toward another given gear ratio at a desired gear position, it is judged that the inertial phase of the transmission has started.

If NO at step 128, that is, when the inertial phase has not started yet, the operation flow goes to step 130 wherein a calculation "T1=T1+1" is carried out for counting an inertial phase starting time "T1" elapsed until the inertial phase will start, more specifically, elapsed from issuance of the gear change instruction to the time when the change of gear ratio starts. Then, the operation flow goes to step 132 wherein a judgement is carried out as to whether the transmission is under the inertial phase or not.

It is to be noted that when the gear ratio of the transmission is under changing from the given gear ratio at the previous gear position toward another given gear ratio at the desired gear position, it is judged that the transmission is under the inertial phase.

If YES at step 132, that is, when the transmission is under the inertial phase, the operation flow goes to step 134 wherein a calculation "T2=T2+1" is carried out for counting an inertial phase keeping time for which the transmission is under the inertial phase. More specifically, the inertial phase keeping time is the time elapsed from the time when, upon the gear change operation, the change of the gear ratio starts to the time when the change of the gear ratio ends. Then, the operation flow goes to step 136 wherein a judgement is carried out as to whether the inertial phase has ended or not. If NO, that is, when the inertial phase has not ended, the programmed operation ends. While, if YES at step 136, that is, when the inertial phase has ended, the operation flow goes to step 138 wherein the flag "FX" is reset to "0" and the other flag "FY" is set to "1". With this manner, the gear change is accomplished.

When thereafter a gear change is not carried out for a while, the operation flow goes through step 124 to step 140. At this step, a judgement is carried out as to whether "FY" is "1" or not. Because the "FY=1" has been established at the previous step 138, step 140 issues YES sign and thus the operation flow goes to step 142. At this step, from an after-described learning control, the correction value "ΔD" is corrected and renewed. Then, the operation flow goes to step 144 wherein the flags "FY", "T1" and "T2" are all reset to "0"

The detail of step 142 is shown in FIG. 7. That is, at step 142, a judgement is carried out as to whether "T1" (viz., the inertial phase starting time) is longer than a predetermined time "T0" or not. If YES at step 150, that is, when "T1" is longer than "T0", the operation flow returns. While, if NO at step 150, that is, when "T1" is shorter than "T0", the operation flow goes to step 152 wherein a judgement is carried out as to whether the time "T1" is longer than another predetermined time "T1S" or not.

It is to be noted that the above-mentioned predetermined time "T0" is longer than another predetermined time "T1S".

If YES at step 152, that is, when the time "T1" is longer than "T1S", the operation flow goes to step 154 wherein the correction value "ΔD" is increased by 2%. While, if NO at step 152, that is, when the time "T1" is shorter than "T1S", the operation flow goes to step 156 wherein the time "T2" (viz., inertial phase keeping time) is compared with a target time "T2S". If they are equal to each other, the operation flow returns. While, if the time "T2" is longer than "T2S", the operation flow goes to step 158 wherein the correction value "αD" is increased by 0.2%, and if the time "T2" is shorter than "T2S", the operation flow goes to step 160 wherein the correction value "ΔD" is reduced by 0.2%.

As will be understood from the above description, when the time "T1" (viz., the inertia phase starting time) is longer than the predetermined time "T0", correction to the correction value "ΔD" is not effected.

With this, even when, due to for example a failure of the select position switch 304, a gear change instruction signal is issued with the transmission assuming N-range, it does not occur that the line pressure is increased.

Figure 10:
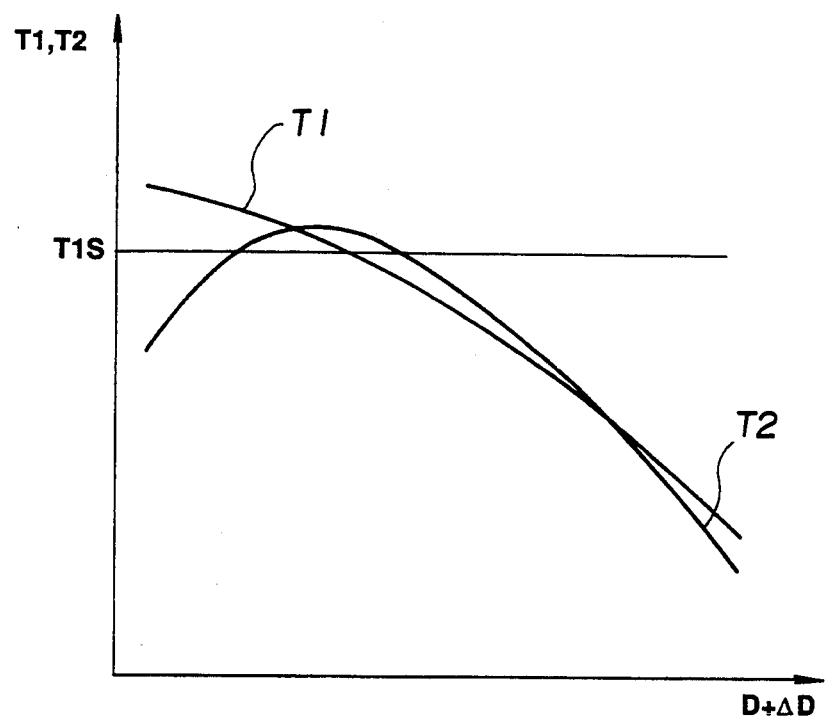
FIG. 10 is a graph showing the characteristic curves of an inertia phase starting time "T1" and an inertial phase keeping time "T2"
Figure 11:
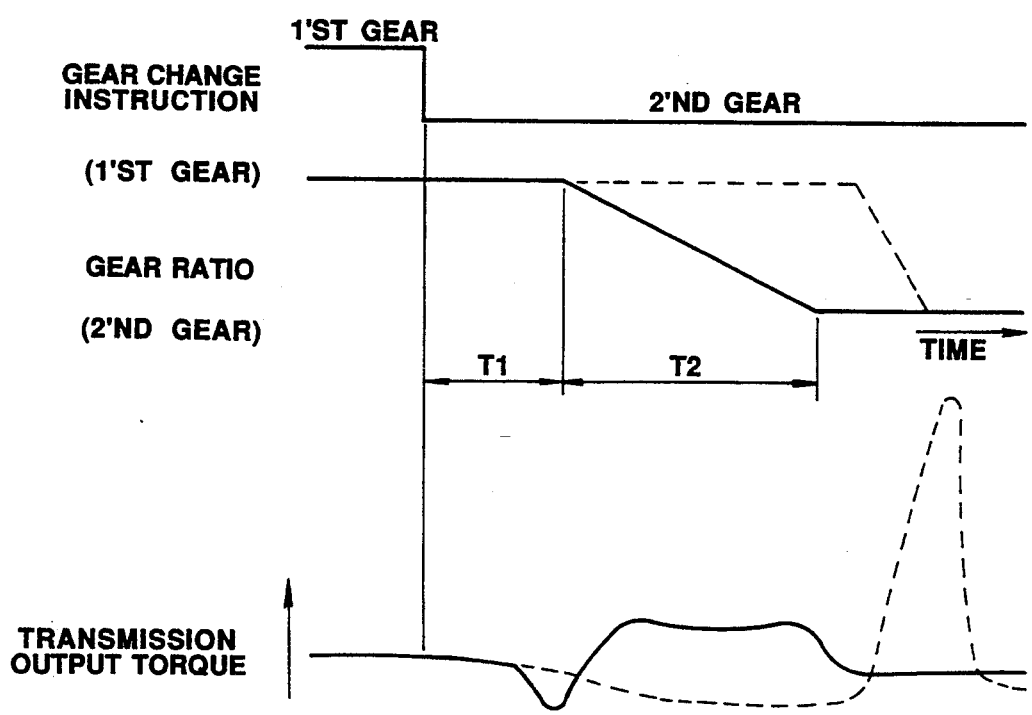
FIG. 11 is a graph showing changes of gear ratio, output torque and line pressure with respect to time elapsed.

FIG. 10 is a graph showing the characteristic curves of the time "T1" and the time "T2" with respect to the sum of the duty ratio "D" and the correction value "ΔD". As is seen from the broken line in the graph of FIG. 11, within a zone wherein the sum "(D+ΔD)" is relatively small and the line pressure is very low, the gear change takes place after adjustment of the line pressure and thus a marked shift shock is produced. Even in this gear change, the time "T2" is relatively short and thus a correction for reducing the correction value "ΔD" is effected assuming that the sum "(D+ΔD)" is too large. In order to avoid this undesired phenomenon, the steps 152 and 154 are employed. That is, when, at step 152, the time "T1" is judged longer than "T1S", the correction value "ΔD" is largely increased (viz., by 2%) for the purpose of instantly reducing the time "T1" to a level shorter than "T1S". While, when, at step 152, the time "T1" is judged shorter than "T1S", the above-mentioned undesired phenomenon does not take place. Thus, in this case, the correction value "ΔD" is corrected (viz., increased or decreased) by only 0.2% by comparing the time "T2" with its target value "T2S". With this, when too low, the line pressure is raised, and when too high, the line pressure is reduced.

As is understood from the foregoing description, in accordance with the present invention, when, during the gear change operation, the inertial phase starting time "T1" exceeds a predetermined time "T1S", the control for quickly increasing the line pressure is suppressed. Thus, when, due to for example a failure of the selection position switch 304, the transmission is kept in N-range irrespective of issuance of D-range instruction signal, the learning control to the line pressure is not carried out. Accordingly, when the select position switch thereafter returns to work, the line pressure assumes a normal condition and thus undesired shift shock is not produced.

What is claimed is:

1. In an automotive automatic transmission having a friction element powered by a line pressure, a control system comprising:

first means for detecting a gear ratio provided by said transmission;

second means for measuring an inertial phase keeping time elapsed from the time when a change of said gear ratio starts to the time when said change ends;

third means for adjusting the line pressure in a manner to harmonize said inertial phase keeping time with a first predetermined time;

fourth means for measuring an inertial phase starting time elapsed from issuance of a gear change instruction to the time when the change of said gear ratio starts;

fifth means for increasing the line pressure irrespective of condition of said third means when said inertial phase starting time exceeds a second predetermined time; and sixth means for suppressing the operation of said fifth means in case wherein even when said inertial phase starting time exceeds a third predetermined time longer than said second predetermined time, the change of said gear ratio fails to occur.

2. A control system as claimed in claim 1, in which said first means detects said gear ratio by comparing information signals issued from respective speed sensors for input and output shafts of the transmission.

3. A control system for an automotive automatic transmission including an input shaft rotation speed sensor for sensing the rotation speed of an input shaft of the transmission, an output shaft rotation speed sensor for sensing the rotation speed of an output shaft of the transmission, a gear ratio deriving means for driving a gear ratio based on the information signals from said input and output shaft rotation speed sensors, an inertial phase keeping time measuring means for measuring the time elapsed from the time when a change of said gear ratio starts to the time when said change ends, a line pressure adjusting means for adjusting the line pressure in a manner to harmonize the inertial phase keeping time with a predetermined target value, an inertial phase starting time measuring means for measuring the time elapsed from issuance of a gear change instruction to the time when the change of said gear ratio starts, and a line pressure increasing means for increasing the line pressure irrespective of condition of said line pressure adjusting means when said inertial phase starting time exceeds a reference value, WHICH IS CHARACTERIZED IN THAT an inhibiting means is employed which inhibits operation of said line pressure increasing means in case wherein even when said inertial phase starting time exceeds a given value longer than said reference value, the change of said gear ratio fails to occur.

* * * * *